US011163521B2

United States Patent
Bowler, II

(10) Patent No.: US 11,163,521 B2
(45) Date of Patent: Nov. 2, 2021

(54) MICROPHONE ASSEMBLY WITH AUTHENTICATION

(71) Applicant: KNOWLES ELECTRONICS, LLC, Itasca, IL (US)

(72) Inventor: Roland K. Bowler, II, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 132 days.

(21) Appl. No.: 16/471,092

(22) PCT Filed: Dec. 29, 2017

(86) PCT No.: PCT/US2017/068980
§ 371 (c)(1),
(2) Date: Jun. 19, 2019

(87) PCT Pub. No.: WO2018/126151
PCT Pub. Date: Jul. 5, 2018

(65) Prior Publication Data
US 2020/0117417 A1 Apr. 16, 2020

Related U.S. Application Data

(60) Provisional application No. 62/441,145, filed on Dec. 30, 2016.

(51) Int. Cl.
*G06F 3/16* (2006.01)
*G10L 15/00* (2013.01)
(Continued)

(52) U.S. Cl.
CPC .............. *G06F 3/165* (2013.01); *G06F 3/162* (2013.01); *G10L 15/22* (2013.01); *G10L 15/28* (2013.01);
(Continued)

(58) Field of Classification Search
CPC . G06F 3/16; G06F 3/162; G06F 3/165; G10L 15/02; G10L 15/22; G10L 15/28;
(Continued)

(56) References Cited

U.S. PATENT DOCUMENTS 5,822,598 A 10/1998 Lam
6,070,140 A 5/2000 Tran
(Continued)

FOREIGN PATENT DOCUMENTS

CN 203813960 U 3/2014

OTHER PUBLICATIONS

International Search Report and Written Opinion dated Mar. 14, 2018—PCT/US2017/68980.

*Primary Examiner* — Thang V Tran
(74) *Attorney, Agent, or Firm* — Foley & Lardner LLP

(57) ABSTRACT

A microphone assembly is disclosed including a microelectromechanical system (MEMS) transducer and an electrical circuit disposed in a housing having an external-device interface. The electrical circuit is configured to determine whether a speech characteristic is present in an electrical signal produced by the transducer, attempt to authenticate the speech characteristic, and provide an interrupt signal to the external device interface only upon successful authentication of the speech characteristic.

26 Claims, 4 Drawing Sheets

(51) Int. Cl.
    *H04R 3/00*     (2006.01)
    *H04R 29/00*     (2006.01)
    *G10L 15/22*     (2006.01)
    *G10L 15/28*     (2013.01)
    *H04R 19/04*     (2006.01)

(52) U.S. Cl.
    CPC ............... *H04R 19/04* (2013.01); *H04R 3/00* (2013.01); *H04R 2201/003* (2013.01)

(58) Field of Classification Search
    CPC . H04R 3/00; H04R 9/08; H04R 11/04; H04R 17/00; H04R 17/02; H04R 19/00; H04R 19/04; H04R 29/00; H04R 29/004; H04R 2201/003
    See application file for complete search history.

(56) References Cited

U.S. PATENT DOCUMENTS

| | | | |
|---|---|---|---|
| 6,154,721 | A | 11/2000 | Sonnic |
| 6,249,757 | B1 | 6/2001 | Cason |
| 6,397,186 | B1 | 5/2002 | Bush et al. |
| 6,756,700 | B2 | 6/2004 | Zeng |
| 7,415,416 | B2 | 8/2008 | Rees |
| 7,774,204 | B2 | 8/2010 | Mozer et al. |
| 7,957,972 | B2 | 6/2011 | Huang et al. |
| 8,275,148 | B2 | 9/2012 | Li et al. |
| 8,666,751 | B2 | 3/2014 | Murthi et al. |
| 8,972,252 | B2 | 3/2015 | Hung et al. |
| 8,996,381 | B2 | 3/2015 | Mozer et al. |
| 9,043,211 | B2 | 5/2015 | Haiut et al. |
| 9,112,984 | B2 | 8/2015 | Sejnoha et al. |
| 2003/0046554 | A1 | 3/2003 | Leydier et al. |
| 2006/0074658 | A1 | 4/2006 | Chadha |
| 2010/0142325 | A1 | 6/2010 | Altman et al. |
| 2012/0232896 | A1 | 9/2012 | Taleb et al. |
| 2012/0310641 | A1 | 12/2012 | Niemisto et al. |
| 2013/0195288 | A1* | 8/2013 | Ye ........................ H04R 19/005 381/111 |
| 2013/0223635 | A1 | 8/2013 | Singer et al. |
| 2014/0163978 | A1 | 6/2014 | Basye et al. |
| 2014/0244269 | A1 | 8/2014 | Tokutake |
| 2014/0257813 | A1* | 9/2014 | Mortensen ............. G10L 15/02 704/251 |
| 2014/0257821 | A1 | 9/2014 | Adams et al. |
| 2014/0270260 | A1* | 9/2014 | Goertz ................... G10L 15/22 381/110 |
| 2014/0274203 | A1* | 9/2014 | Ganong, III ...... H04W 52/0261 455/556.1 |
| 2014/0278435 | A1 | 9/2014 | Ganong et al. |
| 2014/0281628 | A1 | 9/2014 | Nigam et al. |
| 2014/0343949 | A1 | 11/2014 | Huang et al. |
| 2014/0348345 | A1 | 11/2014 | Furst et al. |
| 2015/0106085 | A1 | 4/2015 | Lindahl |
| 2015/0112690 | A1 | 4/2015 | Guha et al. |
| 2015/0134331 | A1 | 5/2015 | Millet et al. |
| 2015/0158722 | A1* | 6/2015 | Lim ........................ B81B 7/02 257/416 |
| 2015/0237429 | A1* | 8/2015 | Ryan .................... H04R 19/005 381/174 |
| 2015/0256916 | A1* | 9/2015 | Volk ........................ H04R 1/04 381/355 |
| 2016/0098921 | A1* | 4/2016 | Qutub .................. G06F 1/3206 367/197 |
| 2018/0061396 | A1* | 3/2018 | Srinivasan ............. G10L 15/08 |
| 2019/0253810 | A1* | 8/2019 | Pawlowski ......... G06F 13/4282 |
| 2020/0336841 | A1* | 10/2020 | Zeleznik ................ H04R 19/04 |

* cited by examiner

MICROPHONE ASSEMBLY WITH AUTHENTICATION

CROSS REFERENCE TO RELATED APPLICATIONS

This application is a National Stage Application of PCT/US2017/068980, filed Dec. 29, 2017, which claims the benefit of and priority to U.S. Provisional Patent Application No. 62/441,145, filed Dec. 30, 2016. The present application is related to U.S. application Ser. No. 14/282,101 entitled "VAD Detection Microphone and Method of Operating the Same" filed May 20, 2014, now U.S. Pat. No. 9,712,923, which claims the benefit of and priority to U.S. Provisional Patent Application No. 61/826,587, filed May 23, 2013. The present application is also related to U.S. application Ser. No. 15/259,473 entitled "Microphone Apparatus and Method With Catch-up Buffer" filed Sep. 8, 2016, now U.S. Pat. No. 9,711,144, which is a continuation of U.S. application Ser. No. 14/797,310, filed Jul. 13, 2015, now U.S. Pat. No. 9,478,234. The contents of each of the aforementioned applications are incorporated herein by reference in their entireties.

FIELD OF THE DISCLOSURE

The present disclosure relates generally to microphones and more particularly to microphone components or assemblies, integrated circuits, and methods for authenticating a user input.

BACKGROUND

The following description is provided to assist the understanding of the reader. None of the information provided or references cited is admitted to be prior art.

Voice control has been increasingly adopted as a favored mode of interaction with a variety of electronics devices including wireless communication handsets, tablets, laptop and personal computers (PCs) among other devices, as well as by electronics devices embedded in vehicles and appliances among other industrial and durable goods. In some instances, the use of more traditional user authentication techniques based on tactile inputs (e.g., passcodes, fingerprints and pattern recognition) and visual inputs (e.g., retinal and facial scanning) may lessen the convenience associated with all voice interaction, since these more traditional approaches require touch or visual interaction with a user interface. More generally, authentication processing is typically performed by circuits on the electronic device, which complicates system architecture and potentially increases power consumption, particularly in always-ON applications. Transitioning such devices from a sleep state to a higher power state in which authentication circuits are activated may result in latency or unnecessary power consumption depending on when the transition occurs. Thus there are competing desires to economize power consumption and to provide a responsive user interface that meets user expectations.

BRIEF DESCRIPTION OF THE DRAWINGS

The objects, features and advantages of the present disclosure will become more fully apparent to those of ordinary skill in the art upon careful consideration of the following Detailed Description and the appended claims in conjunction with the accompanying drawings described below.

Figure 1:
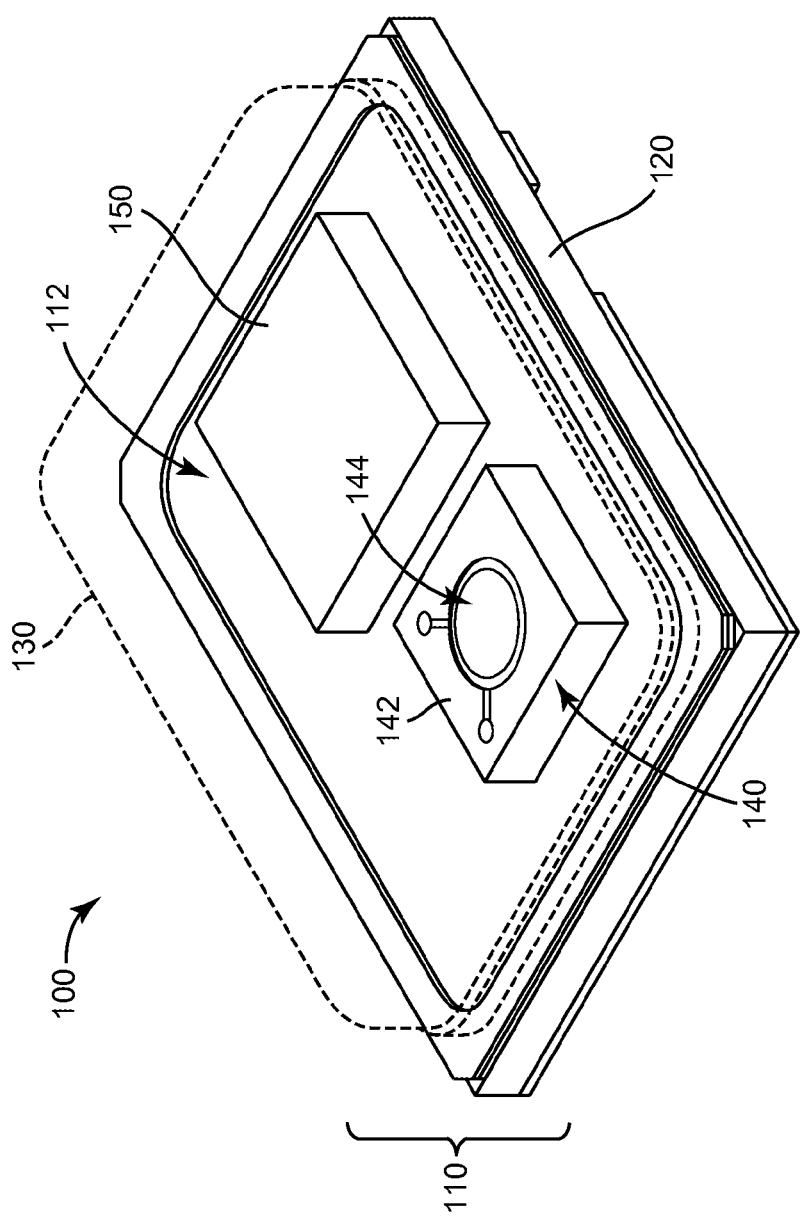
FIG. 1 is a perspective view of a microphone component or assembly.

In the following Detailed Description, reference is made to the accompanying drawings, which form a part hereof. In the drawings, similar symbols typically identify similar components, unless context dictates otherwise. The embodiments disclosed are not to be construed as limiting the teachings herein but rather as enabling those having ordinary skill in the art to make and use the same. Those of ordinary skill will recognize and understand that the representative embodiments can be embodied in a variety of implementations with many arrangements, substitutions, combinations, and designs, all of which are explicitly contemplated and made part of this disclosure.

DETAILED DESCRIPTION

FIG. 1 illustrates a microphone assembly 100 comprising a substrate or base 120 having a cover or lid 130 securely disposed thereon and sealed by an adhesive, solder, or some other known fastening mechanism. The base and cover cooperatively form a housing 110 having an internal cavity 112 in which a transducer and an electrical circuit are disposed as discussed further below. The base may be embodied as a layered material like FR4 with embedded conductors forming a PCB. The cover may be embodied as a metal can, or a layered FR4 material, which may also include embedded conductors. The cover or lid may also be formed from other materials like plastics and ceramics and may also include electromagnetic shielding.

In some embodiments, the housing includes external contacts forming an external device interface for interfacing with an external device like a host. In one embodiment, the interface includes power, ground, clock, data, and select contacts. The particular contacts constituting the interface may depend in part on the protocol with which data is communicated between the microphone assembly and the host device. Such protocols include but are not limited to PDM, SoundWire, I2S, and I2C among other known and future protocols.

In FIG. 1, the external device interface is disposed on the base, but in other embodiments, the interface may be disposed on other portions of the housing. A microphone assembly having an external device interface may also be configured as a surface mount device for integration with a host or other device, for example, by reflow or wave soldering to a PCB or other substrate. Alternatively, the external device interface may be configured for through-hole soldering to a mounting surface or substrate.

In one embodiment, the transducer is a microelectromechanical systems (MEMS) die embodied as a capacitive sensor capable of detecting audible frequencies (sometimes referred to as a condenser microphone). Alternatively, the MEMS die may be embodied as a piezoelectric sensor capable of detecting audible frequencies (sometimes referred to as a crystal microphone). MEMS dice may be formed of a semiconductor material (e.g., silicon) and other materials. In FIG. 1, the transducer is a capacitive microelectromechanical systems (MEMS) sensor 140 including a motor 144 having a diaphragm and a back plate. In other embodiments, other electro-acoustic transducers may be used. In some embodiments, the acoustic transducer also detects changes in pressure above and below the range of frequencies (e.g., 20 Hz-20 kHz) audible to human listeners.

The microphone assembly housing also includes an acoustic port, also referred to as a sound bore, that permits communication of air pressure between the internal cavity and an external environment. The port may be disposed on the lid, or the base, or a side wall. The transducer is disposed within the internal cavity in a manner that permits sensing changes in air pressure via the port. In FIG. 1, a capacitive microelectromechanical systems (MEMS) sensor 140 is disposed on the base 120 over a sound bore. Such a microphone mounting configuration may be referred to as a bottom port device. In other embodiments, however, the transducer may be disposed on some structure than within the cavity other than the base. For example, the transducer may be located on the cover in embodiments where the port is disposed on the cover. Such a microphone mounting configuration may be referred to as a top port device. Side port devices are also contemplated. In other implementations, other types of transducers may be used alternatively as suggested herein. The principles of operation of a MEMS sensor disposed within a housing of a microphone assembly are well known to those having ordinary skill in the art and are not detailed further herein.

Figure 2:
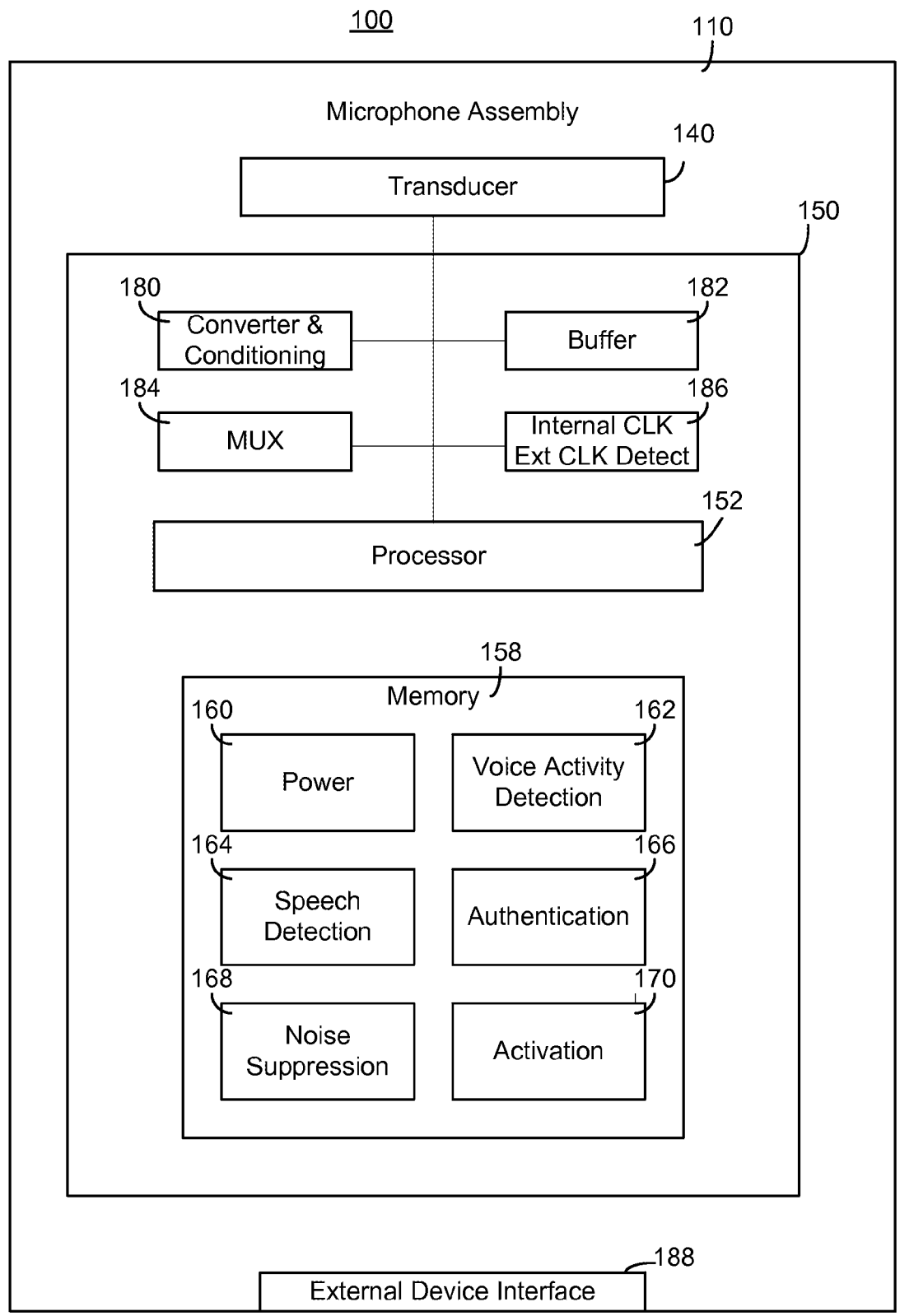
FIG. 2 is a schematic functional-block diagram of the microphone assembly of FIG. 1.

In FIG. 1, the microphone assembly includes an electrical circuit 150 which may be embodied as one or more integrated circuits (e.g., application-specific integrated circuits (ASICs)) disposed in the internal cavity and in electrical communication with the transducer and contacts of the external device interface. The one or more integrated circuits may be mounted on or embedded partially or fully in the base 120 or located elsewhere in the cavity 112. In FIG. 2, the electrical circuit comprises a signal converter 180 configured to convert analog signals output to a digital signal. In one embodiment, the converter is implemented as a sigma-delta modulator but in other embodiments other A/D converters may be used alternatively. The digital signal may be a PDM or PCM format signal, or it may have some other signal format, examples of which are described herein.

In embodiments where the host device sleeps during processing performed by the microphone assembly, the electrical circuit also includes an internal clock signal generator driven by a local oscillator for clocking the electrical circuit. FIG. 2 shows the electrical circuit including an internal clock signal generator 186 for this purpose. However, the internal clock signal generator may not be required in embodiments where the host device provides a clock signal to the microphone assembly at all times.

In FIG. 2, the electrical circuit also includes a processor 152 coupled to the transducer via the converter 180. In embodiments that buffer data representative of the electrical signal, discussed further below, the processor is also coupled to a buffer 182. In embodiments where the circuit is clocked by an internally generated clock signal, the processor is coupled to the internal clock signal generator 186. The processor is also coupled to memory 158 and includes an output coupled to the external device interface 188 of the microphone assembly. The memory stores processor-executable algorithmic code which when executed by the processor configures the processor to perform various functions on the microphone assembly. In FIG. 2, the memory includes several code segments or portions 160, 162, 164, 166, 168 and 170 associated with various functions performed by the microphone assembly as described further herein in connection with representative embodiments. Not all embodiments of the microphone assembly include all code segments shown in FIG. 2, as discussed further herein. While FIG. 2 shows the code segments as discrete elements, the segments may be embodied as one or more programs, depending on the architecture of the circuit. Also, while the processor 152 is shown as a single processor, it may be implemented as multiple processors. For example, one processor may perform relatively less complex operations like voice activity detection and data buffering, while another processor, like a DSP, may be tasked with more complex operations like noise reduction, speech detection, and authentication. Also, the one or more processors may be designed to perform specific functions through dedicated logic gates to accelerate processing. As suggested, the electrical circuit 150 may be embodied most typically as an integrated circuit (IC), which may comprise a single IC or multiple ICs depending on the desired architecture. The allocation of different functions to different processors may dictate at least in part the architecture of the program segments constituting the processor-executable algorithmic code described herein.

Figure 3:
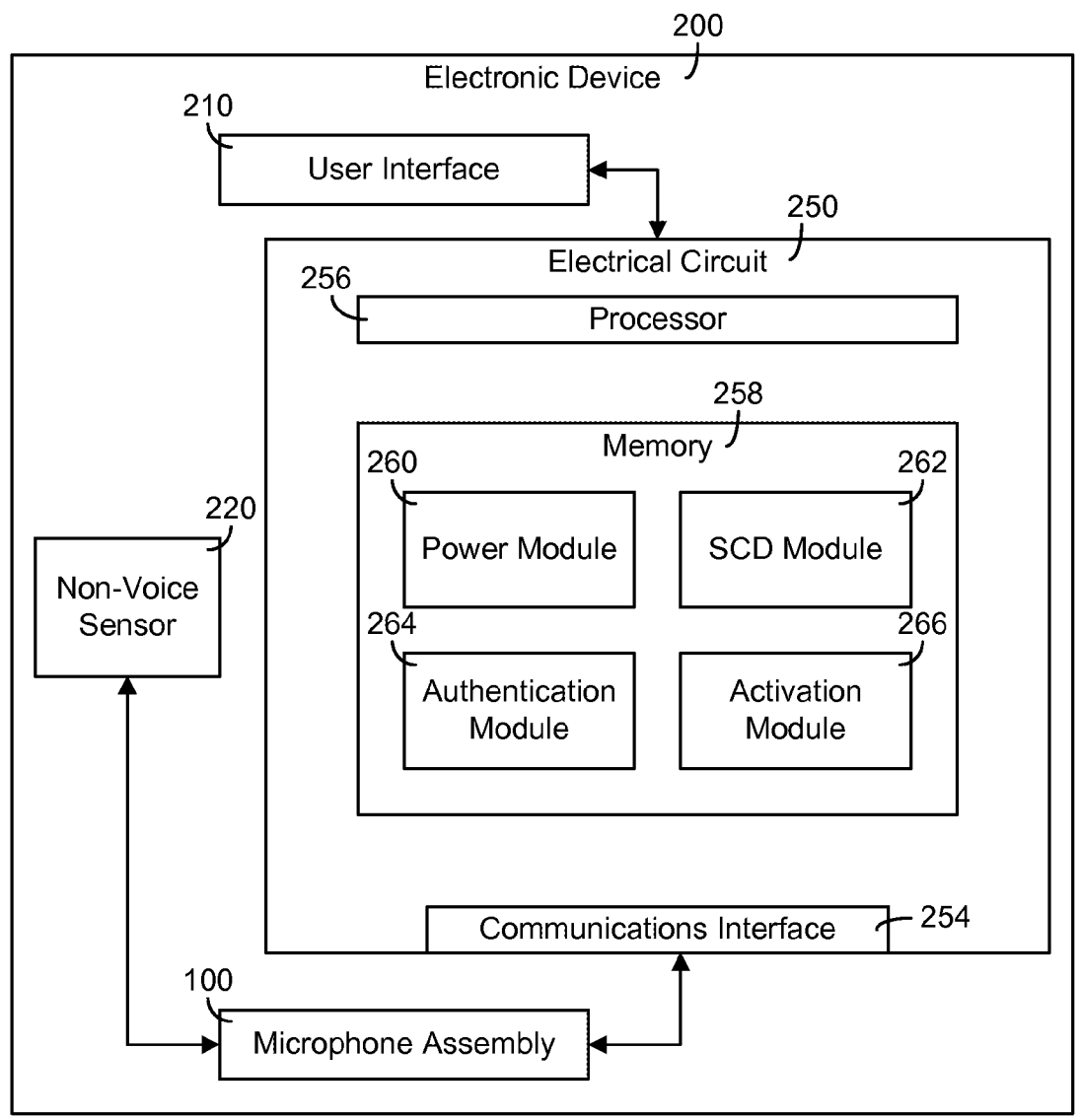
FIG. 3 is a schematic block diagram of an electronic device including the microphone component of FIG. 1.

In FIG. 3, a microphone assembly 100 is embedded in or otherwise integrated with an electronic device or host 200. The host may be embodied as a wireless communication handset, tablet, laptop or personal computer (PC), gaming station, handheld or fixed-location remote control device, wearable device like a smart watch, among other devices. The microphone assembly may also be embedded in an appliance like a refrigerator, oven, washer, dryer and other durable goods as well in as industrial machines and ground, air and water vehicles. The integration of the microphone assembly permits voice-controlled interaction with the host device. In some embodiments, the microphone assembly enables non-voice controlled interaction with the host device. These and other aspects of the disclosure are detailed further herein.

According to one aspect of the disclosure, the microphone assembly processes data representative of an electrical signal generated by the transducer while the host device, with which the microphone is integrated, operates in a low power mode (e.g., a partial or full sleep mode). While the host sleeps, the microphone assembly is clocked by an internal clock signal produced by a local oscillator, since the sleeping host may be unable to provide a clock signal to the microphone. The microphone assembly subsequently awakens the host device only upon satisfaction of one or more criterion, examples of which are discussed herein. Performing such functions on the microphone assembly while the host device sleeps reduces power consumption by the host. Power consumption by the microphone assembly may also be reduced by operating the microphone at different power consumption levels depending on the function to be performed. Circuits specifically dedicated to the functions performed by the microphone also permit efficient power consumption by the microphone relative to the power that would otherwise be consumed by many host devices performing the same functions. Thus the microphone can be operated in an always-ON mode at very low power levels with reduced latency when responding to user commands. In other embodiments however the microphone assembly processes data representative of an electrical signal generated by the transducer while the host device remains awake. Representative embodiments and implementation examples are also discussed.

Figure 4:
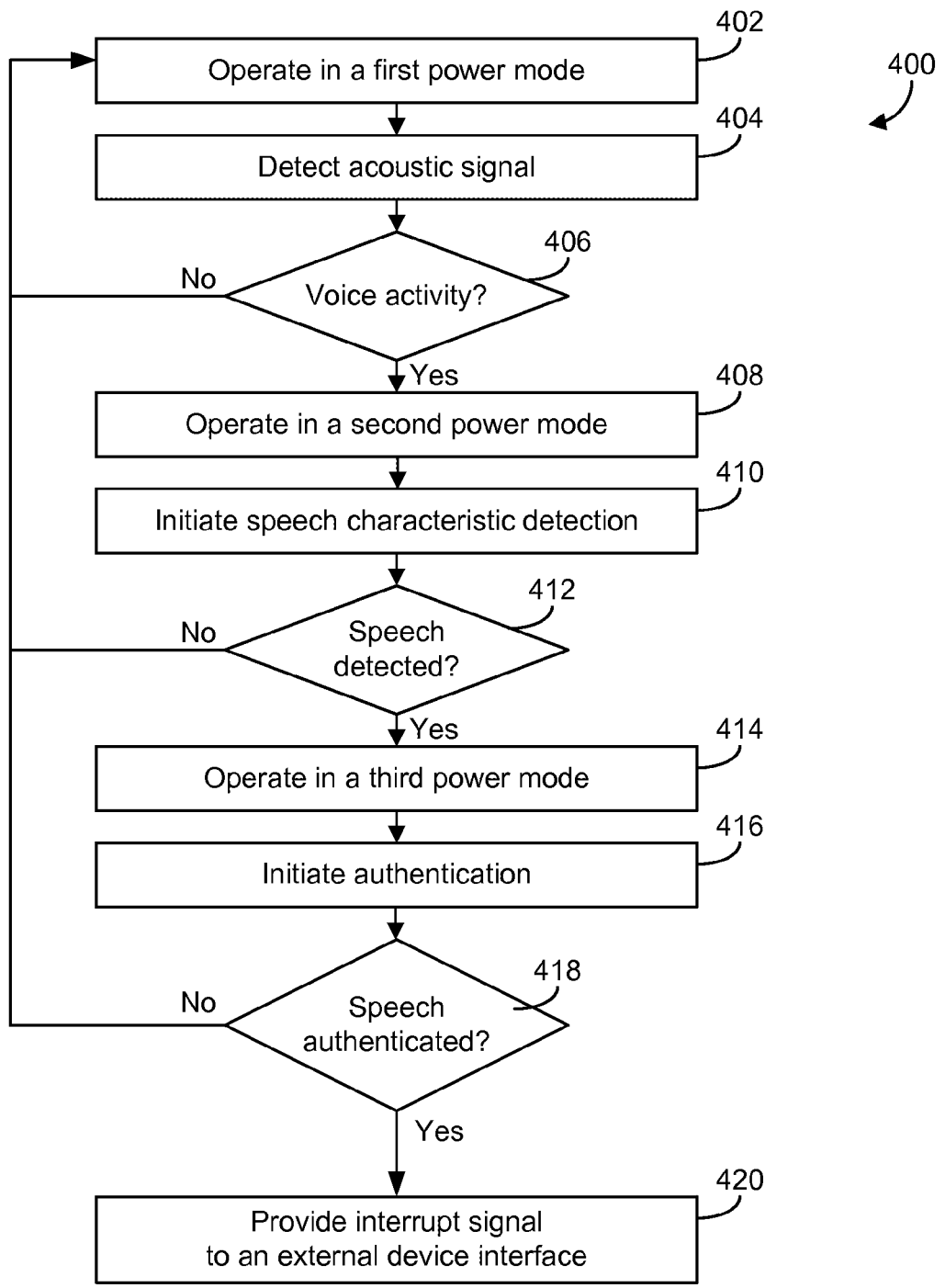
FIG. 4 is a schematic process diagram for performing voice processing in a microphone.

In various embodiments, the microphone assembly implements some or all of the algorithmic process illustrated in FIG. 4. At 402, the microphone assembly operates in a first power mode during voice activity detection, which may be characterized as voice-noise discrimination. At 404, the microphone determines whether there is voice activity in the electrical signal generated by the transducer. In FIG. 2, upon execution of voice activity (VAD) code 162 stored in memory 158 the processor is configured to determine whether voice activity is present in the electrical signal by processing data representative of the electrical signal. Alternatively, voice activity detection may be performed by equivalent hardware or a combination of hardware and software. As suggested above, such data may be PCM format, PDM format, or some other signal format. Various schemes for detecting voice activity are known generally to those of ordinary skill in the art and such schemes are not discussed further herein. At 406, the algorithm iterates in the voice activity detection mode until voice activity is detected. During voice activity detection, which is often enabled in always-ON applications, it may be desirable to reduce power consumption, particularly in battery-powered devices. Power consumption may be reduced by deactivating circuits not required for voice activity detection and by clocking the microphone at a low frequency. The minimum sampling rate required by the voice activity algorithm however may impose a lower limit on the clock frequency during this mode.

In FIG. 4, at 410, upon detection of voice activity, the microphone initiates speech characteristic detection. Speech or speech characteristics include phonemes, keywords, voice commands, phrases, etc. that are used to interact with the microphone or with the host device via the microphone. Thus speech characteristic detection is different than voice activity detection. In FIG. 2, upon execution of speech characteristic detection code 164 stored in memory 158, the processor is configured to attempt to determine whether a speech characteristic is present in the electrical signal by processing data representative of the electrical signal. Alternatively, speech detection may be performed by equivalent hardware or a combination of hardware and software. As suggested above, speech detection processing may be performed on data having a PCM format, PDM format, or some other format. Various schemes for detecting speech characteristics are known generally to those of ordinary skill in the art and such schemes are not discussed further herein.

During speech characteristic detection, power consumption is generally increased relative to the power consumption during voice activity detection due in part to additional load on the processor associated with performing both voice activity and speech detection. For example, the clock frequency may be increased or another processor may be enabled to perform the speech detection function. These power-related factors may be controlled by the processor upon execution of the power code 160 or the speech detection code 164 or a combination thereof. In embodiments where voice activity detection is implemented, speech detection occurs only after voice activity is detected. Also, at 412 in FIG. 4, if speech is not detected during speech detection, the circuit transitions to the lower power voice activity detection mode at 402.

In FIG. 4, at 416, upon detection of speech, the microphone attempts to authenticate the detected speech. As suggested above, such a speech characteristic could be a keyword or phrase, e.g., "OK Knowles" or some other word or command. Authentication ensures that a user attempting to interact with the host device via the microphone assembly is authorized to do so. In FIG. 2, upon execution of authentication code 166 the processor is configured to attempt to authenticate the speech characteristic detected during speech detection. Alternatively, authentication may be performed by equivalent hardware or a combination of hardware and software. As suggested above, the data on which authentication processing occurs may be PCM format, PDM format, or some other format. Various schemes for authenticating speech characteristics are known generally to those of ordinary skill in the art and such schemes are not discussed further herein.

During authentication, power consumption may be increased relative to the power consumption during speech detection due in part to additional processing load. For example, the clock frequency may be increased or another processor may be enabled to accommodate the additional load associated with authentication processing. These power-related factors may be controlled by the processor upon execution of the power code 160 or the authentication code 166 or a combination thereof. At 418 in FIG. 4, if the detected speech is not authenticated, the circuit transitions to the lower power voice activity detection mode at 402.

In FIG. 4, at 420, if the detected voice is authenticated successfully, the microphone assembly provides an interrupt signal to an external interface of the microphone assembly. The interrupt signal could take many different forms. In one implementation, the internal clock signal generated by the microphone assembly is provided on a contact of the external device interface. Alternatively, the interrupt is a high or low select signal provided on the external device interface of the microphone assembly. The internal clock signal or the select signal may be provided on a select contact or some other contact of the interface. In another implementation, data provided on a data contact of the interface may be interpreted as an interrupt. Other signals may be used alternatively. In FIG. 2, upon execution of activation code 170 the processor is configured to provide the interrupt signal at the external device interface via an interface of the electrical circuit. Providing the interrupt after successfully authenticating detected speech on the microphone assembly relieves the host device from having to perform such function, at least preliminarily. In embodiments where the host device sleeps, authenticating before awakening the host reduces the likelihood that the host will be awakened unnecessarily. Still in some applications, whether the host sleeps or not, the host device may perform more robust authentication processing after receiving the interrupt from the microphone.

Generally, the electrical circuit is configured to provide data representative of the electrical signal to the external device interface after, but generally not before, providing the interrupt to the external device interface. Thus the interrupt indicates that the microphone assembly has data for the host device. In embodiments where the host device sleeps during processing by the microphone assembly, the interrupt may also be a wake-up cue for the host device. In embodiments where the host device does not sleep during processing by the microphone, the interrupt may indicate that the microphone assembly has data to provide to host device. In one implementation, the host device provides an external clock signal to the external device interface of the microphone, for example on an external clock contact of the interface. In response, the electrical circuit clocks the microphone assembly based on the external clock signal. For example, the internal clock signal may be synchronized with an external clock signal having approximately the same frequency. Alternatively, the microphone assembly may be clocked by the external clock signal, which may have a different frequency than the internal clock signal of the microphone. In any case, the microphone and the host are synchronized. In embodiments where the host device provides an external clock signal to the microphone in response to an interrupt signal, the microphone may wait for the external clock signal to ensure synchronization before sending data to the external device interface. In FIG. 2, the electrical circuit includes external clock detection functionality that determines whether to clock the microphone using the internal clock or based on the external clock. The microphone is clocked based on the external clock signal when the external clock is detected at the external device interface.

In some embodiments, the microphone assembly performs noise suppression on data representative of the electrical signal before speech characteristic detection or at least before authentication. As suggested above noise suppression may be part of a more robust authentication process occurring after a successful preliminary authentication procedure. As used herein, noise suppression includes noise reduction, voice enhancement, echo cancellation, and other signal processing that improves the quality of detected speech or voice signals. Noise suppression may be used to improve the accuracy of speech detection, authentication or both, but may do so at the cost of greater processing and memory resource requirements and possible processing delay. In FIG. 2, upon execution of noise suppression code 168, the processor is configured to suppress noise in data representative of the electrical signal generated by the transducer. Noise suppression may be performed before or after speech detection. The data on which noise suppression processing occurs may be PCM format, PDM format, or some other format. Various schemes for suppressing noise are known generally to those of ordinary skill in the art and such schemes are not discussed further herein.

In some embodiments, in FIG. 2, the electrical circuit of the microphone assembly includes a buffer 182 wherein data representative of the electrical signal detected by the transducer is buffered during processing by the microphone. The buffering of data prevents the loss of data received during processing as discussed herein. The buffered data could be PDM or PCM format, or some other format. In some embodiments the sampling rate of the digital signal may be reduced by a decimator to lessen processing and memory resource requirements. In one implementation, data from a sigma-delta modulator is decimated to reduce the sampling rate and hence the memory required to buffer the data. The sampling rate of data read from the buffer may be increased by an interpolator to compensate for decimation prior to buffering. The decimation and interpolation is illustrated schematically by the conditioning block 180. In practice however these devices are not necessarily co-located with the signal converter. The voice activity algorithm may impose a limit on the rate at which data may be sampled and thus the sampling rate of the buffered data may be different than the sampling rate of the data on which voice activity detection is performed. The format of the buffered data may be different than the format of the data on which voice activity detection is performed. The buffering function may be controlled by the processor upon execution of one or more code segments stored in memory or by equivalent hardware circuits.

In embodiments where the microphone assembly performs only speech detection and authentication, without performing voice activity detection, buffering occurs during the speech detection and authentication. In this case, the buffer has sufficient capacity to store data representative of the electrical signal generated by the transducer during the time required to detect and authenticate speech, wake-up the host and configure the microphone for data transmission. In embodiments where the microphone assembly also performs voice activity detection, buffering occurs during voice activity detection, speech detection and authentication. In this case, the buffer must have sufficient capacity to store data representative of the electrical signal generated by the transducer during the time required to perform voice activity detection as well. Additional buffering capacity may be required if noise suppression is applied.

Generally, after successful authentication and interruption of the host device, data is provided to the external device interface. Data obtained from the transducer is streamed to the external device interface for communication to the host device. In embodiments that do not include buffering, data received after authentication may be provided to the external device interface in real-time and any speech in data received prior to authentication will be lost. In embodiments that include buffering, the entire speech stream may be reconstructed by stitching the buffered data to the data received after authentication. The stitching may occur at the microphone assembly or at the host device. Thus in embodiments that include buffering, both buffered data and data received after interrupt are provided at the external device interface. In some embodiments, there is some temporal overlap between buffered data and real-time data to ensure continuity and eliminate or reduce transition artifacts. In one embodiment, the data provided to the external device interface is delayed by the time required for processing prior to providing the interrupt host wake-up and any reconfiguration of the microphone for data transmission, but this latency may be unacceptable for some applications. In another embodiment, the buffered data is provided to the external device faster than real-time. Faster than real-time may mean faster than the rate at which such data (e.g., the buffered data, the real-time data, etc.) is received (i.e., over-clocked) or it may mean that data sent concurrently and virtually simultaneously (e.g., multiplexed).

In one implementation, after providing an interrupt and any required reconfiguration of the microphone assembly for data transmission (e.g., clock synchronization), buffered data is multiplexed with real-time data and the multiplexed data is clocked on a data contact of the external device. The multiplexing occurs until the buffered data stream aligns with and in some implementations overlaps with the real-time data stream. As suggested above, some temporal overlap ensures continuity of the transition and permits reduced transition artifacts. In FIG. 2, a multiplexer 180 multiplexes data obtained from buffer 182 with real-time data obtained from converter 180. In one embodiment, the real-time data is clocked on one edge of a clock signal and the buffered data is clocked on another edge of the clock signal. The clock signal may be based on external clock.

In some embodiments, as suggested above, the microphone apparatus performs only speech detection and authentication, without performing voice activity detection or noise suppression. In such implementations, the microphone assembly attempts, in the first instance, to detect speech characteristics in the electrical signal generated by the transducer without first performing voice activity detection. Such an approach may consume more power, particularly in always-ON applications. But some applications do not have severe power constraints, for example, devices powered by connection to a power main. Such a direct approach may reduce response latency to user input.

Thus in one implementation, an acoustic microphone assembly comprises an electro-acoustic MEMS sensor and an electrical circuit disposed in a housing of the microphone. The electrical circuit includes memory storing processor-executable code including a speech characteristic detection portion and an authentication portion. FIG. 2 shows the speech detection code segment 164 and the authentication code segment 166 as discrete components, but these segments may be combined in a single program. In this embodiment, there is no buffering or noise suppression since these program segments are not required or may be disabled. Thus upon execution of the processor-executable code the processor is configured to determine whether a speech characteristic is present in the electrical signal, attempt to authenticate the speech characteristic only after determining the speech characteristic is present, and provide an interrupt signal to the external device interface only upon successful authentication of the speech characteristic. In some implementations of this embodiment, data representative of the electrical signal is buffered in a buffer while determining whether the speech characteristic is present and while attempting to authenticate the speech characteristic.

In other embodiments, the executable algorithm includes a voice activity detection portion, wherein upon execution of the algorithm the processor is configured to determine whether voice activity is present in the electrical signal, and wherein the processor is configured to determine whether the speech characteristic is present only after determining that voice activity is present. In implementations of this embodiment, data representative of the electrical signal may also be buffered in the buffer while determining whether voice activity is present, while determining whether the speech characteristic is present, and while attempting to authenticate the speech characteristic.

As discussed herein, much of the functionality of the microphone assembly is performed by an integrated circuit of the microphone apparatus. The integrated circuit generally comprises an input configured to receive an electrical signal representative of acoustic energy, a signal converter coupled to the input and configured to generate a digital signal from the electrical signal, memory storing a processor-executable algorithm including at least a speech characteristic detection portion and a speech authentication portion, and a processor coupled to the memory, the signal converter, and to an interface of the integrated circuit. Upon execution of the processor-executable algorithm, the processor is configured to determine whether a speech characteristic is present in the electrical signal, attempt to authenticate the speech characteristic only if the speech characteristic is present while data representative of the digital signal is buffered in the buffer, and provide an interrupt signal at the interface only if the speech characteristic is authenticated.

In some embodiments, the integrated circuit optionally includes a buffer coupled to the signal converter, and the processor is configured to buffer data during speech detection and authentication to avoid potential loss of speech or voice input. In a related embodiment, the processor-executable algorithm of the integrated circuit optionally includes a voice activity detection portion wherein, upon execution of the processor-executable algorithm, the processor is configured to determine whether voice activity is present in the electrical signal while data representative of the digital signal is buffered in the buffer, and the processor is configured to determine whether the speech characteristic is present only upon determining that voice activity is present.

In embodiments that include buffering, the integrated circuit includes a multiplexer coupled to the buffer, the signal converter, and the interface, wherein the processor is configured to provide a multiplexed data stream from the multiplexer to the interface only after the speech characteristic is authenticated. The multiplexed data stream includes a buffered data stream and a subsequently received real-time data stream representative of the electrical signal. The integrated circuit may also comprise a protocol interface for configuring output data provided to the external device interface of the microphone assembly according to a particular protocol. Such protocols include but are not limited to PDM, SoundWire, I2S and I2C among other protocols.

In implementations where the microphone assembly is integrated with a host device that sleeps during processing by an always-ON microphone assembly, the integrated circuit of the microphone assembly includes clock circuit configured to provide an internal clock signal, wherein the integrated circuit is clocked by the internal clock signal before the interrupt signal is provided at the interface of the integrated circuit. In some implementations, the interrupt signal is a host device wake-up signal and the clock circuit is configured to clock the integrated circuit based on an external clock signal received at the interface in response to the host device wake-up signal provided at the interface.

In some embodiments, the processor-executable algorithm of the integrated circuit optionally includes a noise suppression portion, wherein upon execution of the processor-executable algorithm, the processor is configured to suppress noise in the electrical signal, wherein the noise suppression improves accuracy of the speech characteristic detection or authentication or both.

In FIG. 3, a microphone assembly is integrated with a host electronic device 200, examples of which are disclosed herein. The host device 200 may comprise a user interface 210 specific to the type of host device and its intended application. The user interface may include one or more of a display screen, a touch screen, a keyboard, buttons (e.g., a home button, volume buttons, a power button, etc.), among other interface components. The host device also includes a non-voice sensor 220 that may be separate from or integrated with other elements of the user interface, and an electrical circuit 250. The external device interface of the microphone assembly 100 is mechanically and electrically coupled to a communications interface 254 and to the non-voice sensor 220. Alternatively, the microphone assembly may be coupled to the non-voice sensor by a secure wireless connection.

The non-voice sensor 220 may be embodied as a touch interface sensor, a fingerprint sensor, image sensor among other non-voice sensors. By way of example, the sensor may be embodied as or include a camera device configured to facilitate performing retinal scanning and/or facial recognition. By way of another example, the sensor may be or include a finger print scanner configured to facilitate scanning a finger print of an operator of the user device 200. The sensor 220 may also be embodied as an alpha-numeric input device or a pattern detection interface among others.

In one embodiment, the microphone assembly 100 detects and authenticates a user input to the non-voice sensor 220 of the host device 200. In FIG. 2, upon execution of the authentication code segment of the algorithm the processor is configured to detect the present of the non-voice sensor and attempt to authenticate user input thereto. According to this embodiment, the microphone assembly provides an interrupt to the host device upon successfully authenticating the input at the non-voice sensor. Such a configuration provides always-ON non-voice input detection functionality while permitting the host device to sleep. The host device is thus relieved of having to wake and scan the peripheral non-voice sensor for input. Thus configured, the host device may be awakened using either voice commands or other traditional non-voice user interactions. In one embodiment, the non-voice sensor is also coupled directly to the host device. According to this embodiment, the host device will accept input at the non-voice sensor when the host is awake, but not when the host is asleep. Thus should the user interface become locked when the host device is awake, the user can unlock the interface using the non-voice sensor without communication via the microphone assembly.

While the disclosure and what is presently considered to be the best mode thereof has been described in a manner that establishes possession by the inventor and that enables those of ordinary skill in the art to make and use the same, it will be understood and appreciated that there are many equivalents to the embodiments disclosed herein and that myriad modifications and variations may be made thereto without departing from the scope and spirit of the invention, which are to be limited not by the exemplary embodiments but by the appended claims and their equivalents.

What is claimed is:

1. An acoustic microphone assembly comprising:
a housing defining an internal cavity and a sound bore;
a microelectromechanical system (MEMS) sensor disposed within the internal cavity, the sensor positioned to receive sound through the sound bore, and configured to convert the sound into an electrical signal;
an external device interface disposed on an exterior surface of the housing; and
an electrical circuit disposed in the internal cavity, the electrical circuit including memory storing an executable algorithm including a speech characteristic detection portion and an authentication portion, the electrical circuit including a processor coupled to the sensor and the external device interface,
wherein upon execution of the algorithm the processor is configured to:
determine whether a speech characteristic is present in the electrical signal;
attempt to authenticate the speech characteristic only after determining the speech characteristic is present; and
provide an interrupt signal to the external device interface only upon successful authentication of the speech characteristic.

2. The assembly of claim 1, the executable algorithm including a voice activity detection portion, wherein upon execution of the algorithm the processor is configured to determine whether voice activity is present in the electrical signal, and wherein the processor is configured to determine whether the speech characteristic is present only after determining that voice activity is present.

3. The assembly of claim 2, further comprising a buffer, wherein data representative of the electrical signal is buffered in the buffer while determining whether voice activity is present, while determining whether the speech characteristic is present, and while attempting to authenticate the speech characteristic.

4. The assembly of claim 3, wherein the electrical circuit includes a local oscillator that clocks the microphone assembly with an internal clock signal prior to the interrupt signal being provided to the external device interface.

5. The assembly of claim 4, wherein the microphone assembly operates at a first power level during execution of the voice activity detection portion and at a second power level during execution of the speech characteristic detection portion, wherein the first power level is less than the second power level.

6. The assembly of claim 5, wherein the electrical circuit is configured to provide data representative of the electrical signal to the external device interface after, but not before, providing the interrupt to the external device interface, at least some of the data provided to the external device interface based on the buffered data.

7. An integrated circuit for a microphone apparatus, the integrated circuit comprising:
an input configured to receive an electrical signal representative of acoustic energy;
a signal converter coupled to the input and configured to generate a digital signal from the electrical signal;
a buffer coupled to the signal converter;
a memory storing an processor-executable algorithm including a speech characteristic detection portion and a speech authentication portion; and
a processor coupled to at least one of the memory, the signal converter, and to an interface of the integrated circuit,
wherein upon execution of the processor-executable algorithm, the processor is configured to:
determine whether a speech characteristic is present in the electrical signal while data representative of the digital signal is buffered in the buffer;
attempt to authenticate the speech characteristic only if the speech characteristic is present while data representative of the digital signal is buffered in the buffer; and
provide an interrupt signal at the interface only if the speech characteristic is authenticated.

8. The integrated circuit of claim 7 wherein,
the processor-executable algorithm includes a voice activity detection portion, wherein upon execution of the processor-executable algorithm,
the processor is configured to determine whether voice activity is present in the electrical signal while data representative of the digital signal is buffered in the buffer,
the processor is configured to determine whether the speech characteristic is present only upon determining that voice activity is present.

9. The integrated circuit of claim 8, wherein the speech characteristic includes at least one of a phoneme, a keyword, a voice command, or a phrase.

10. The integrated circuit of claim 8, wherein the processor is configured to operate the integrated circuit in a first mode of operation during execution of the voice activity detection portion and in a second mode of operation during execution of the speech characteristic detection portion, wherein a power consumption during the first mode of operation is less than a power consumption during the second mode of operation.

11. The integrated circuit of claim 7, wherein the processor-executable algorithm includes a noise suppression portion, wherein upon execution of the processor-executable algorithm, the processor is configured to suppress noise in the electrical signal, wherein the noise suppression improves accuracy of at least one of speech characteristic detection or authentication.

12. The integrated circuit of claim 7, further comprising a multiplexer coupled to the buffer, the signal converter, and the interface, wherein the processor is configured to provide a multiplexed data stream from the multiplexer to the interface only after the speech characteristic is authenticated, the multiplexed data stream including a buffered data stream and a real-time data stream representative of the electrical signal, the multiplexed data stream provided at the interface at least until a portion of the buffered data stream overlaps a portion of the real-time data stream.

13. The integrated circuit of claim 7, further comprising a clock circuit configured to provide an internal clock signal, wherein the processor is clocked by the internal clock signal before the interrupt signal is provided at the interface of the integrated circuit.

14. The integrated circuit of claim 13, wherein the interrupt signal is a host device wake-up signal, and wherein the clock circuit is configured to clock the integrated circuit based on an external clock signal received at the interface in response to the host device wake-up signal being provided at the interface.

15. A method in a microphone apparatus including an acoustic sensor and an electrical circuit disposed within a housing having an external device interface, the method comprising:
 generating an electrical signal representative of acoustic energy detected by the acoustic sensor;
 determining whether a speech characteristic is present in the electrical signal while buffering data representative of the electrical signal in a buffer of the electrical circuit;
 attempting to authenticate the speech characteristic determined to be present in the electrical signal only after determining that the speech characteristic is present, the authentication occurring at the microphone apparatus; and
 providing an interrupt signal at the external device interface only after successfully authenticating the speech characteristic.

16. The method of claim 15, further comprising clocking the microphone apparatus with a clock signal obtained from an oscillator of the electrical circuit before providing the interrupt signal at the external device interface.

17. The method of claim 16, wherein the interrupt signal is a host device wake-up signal, the method further comprising:
 receiving an external clock signal at the external device interface in response to providing the host device wake-up signal; and
 clocking the microphone apparatus with the clock signal based at least in part on the external clock signal received at the external device interface.

18. The method of claim 17, further comprising providing a buffered data stream multiplexed with a real-time data stream at the external device interface after authenticating the speech characteristic at least until a portion of the buffered data stream overlaps a portion of the real-time data stream, wherein the buffered data stream and the real-time data stream are representative of portions of the electrical signal.

19. The method of claim 15 further comprising:
 determining a likely presence of voice activity in the electrical signal when operating the microphone apparatus in a first mode;
 buffering data representative of the electrical signal in the buffer while determining the likely presence of voice activity;
 determining whether the speech characteristic is present while operating the microphone apparatus in a second mode only after determining the likely presence of voice activity;
 reverting from the second mode to the first mode if the speech characteristic is not present or if authentication is unsuccessful;
 clocking the microphone apparatus with a clock signal obtained from an oscillator of the microphone apparatus before providing the interrupt signal,
 wherein a power consumption of the first mode is less than the power consumption of the second mode.

20. The method of claim 15, further comprising performing noise suppression on data representative of the electrical signal before determining whether the speech characteristic is present, wherein the noise suppression occurs at the microphone apparatus.

21. An acoustic microphone assembly comprising:
 a housing having an external device interface disposed on an exterior surface of the housing;
 an electroacoustic transducer disposed in the housing;
 an electrical circuit disposed in the housing, the electrical circuit configured to:
  determine whether a speech characteristic is present in an electrical signal generated by the transducer;
  attempt to authenticate the speech characteristic only after determining the speech characteristic is present; and
  provide an interrupt signal to the external device interface only upon successful authentication of the speech characteristic.

22. The assembly of claim 21, the electrical circuit configured to determine whether voice activity is present in the electrical signal before determining whether the speech characteristic is present.

23. The assembly of claim 22, the electrical circuit including a buffer, wherein the electrical circuit is configured to buffer data representative of the electrical signal while determining whether voice activity is present, while determining whether the speech characteristic is present, and while attempting to authenticate the speech characteristic.

24. The assembly of claim 23, the electrical circuit including a local oscillator configured to clock the microphone assembly prior to providing an interrupt signal from the external-device interface.

25. The assembly of claim 24, the electrical circuit configured to operate at a first power level during execution of the voice activity detection portion and to operate at a second power level during execution of the speech characteristic detection portion, wherein the first power level is less than the second power level.

26. The assembly of claim 25, the electrical circuit configured to provide data representative of the electrical signal to the external-device interface after, but not before, providing the interrupt to the external-device interface, wherein at least some of the data provided to the external-device interface based on the buffered data.

* * * * *